(12) United States Patent
Rogers

(10) Patent No.: US 8,484,883 B2
(45) Date of Patent: Jul. 16, 2013

(54) DECOY MOTION TECHNOLOGY

(75) Inventor: Jay Rogers, Hudson, WI (US)

(73) Assignee: Expedite International, Inc., Hudson, WI (US)

( * ) Notice: Subject to any disclaimer, the term of this patent is extended or adjusted under 35 U.S.C. 154(b) by 253 days.

(21) Appl. No.: 12/386,425

(22) Filed: Apr. 17, 2009

(65) Prior Publication Data

US 2009/0260274 A1 Oct. 22, 2009

Related U.S. Application Data

(60) Provisional application No. 61/124,490, filed on Apr. 17, 2008.

(51) Int. Cl.
*A01M 31/06* (2006.01)

(52) U.S. Cl.
USPC ............................................................. 43/2

(58) Field of Classification Search
USPC .......................................................... 43/3, 2
See application file for complete search history.

(56) References Cited

U.S. PATENT DOCUMENTS

| | | | | |
|---|---|---|---|---|
| 1,376,282 A * | 4/1921 | Kauffman | | 43/2 |
| 2,547,286 A * | 4/1951 | Sabin | | 43/3 |
| 2,616,200 A * | 11/1952 | Milam | | 43/3 |
| 2,726,469 A * | 12/1955 | Becker | | 43/3 |
| 3,916,553 A * | 11/1975 | Lynch et al. | | 43/3 |
| 4,056,890 A * | 11/1977 | Dembski | | 43/3 |
| 4,322,908 A * | 4/1982 | McCrory | | 43/3 |
| 4,422,257 A * | 12/1983 | McCrory | | 43/3 |
| 4,535,560 A * | 8/1985 | O'Neil | | 43/3 |
| 4,660,313 A * | 4/1987 | Bauernfeind et al. | | 43/3 |
| 5,074,071 A * | 12/1991 | Dunne | | 43/3 |
| 5,832,649 A * | 11/1998 | Kilgore | | 43/2 |
| 5,956,880 A * | 9/1999 | Sugimoto | | 43/2 |
| 6,079,140 A * | 6/2000 | Brock, IV | | 43/3 |
| 6,357,159 B1 * | 3/2002 | Bowling | | 43/2 |
| 6,442,885 B1 * | 9/2002 | Payne | | 43/3 |
| 6,625,919 B1 * | 9/2003 | Davis et al. | | 43/3 |
| 6,834,458 B1 * | 12/2004 | Hand et al. | | 43/3 |
| 6,845,586 B1 * | 1/2005 | Brock, IV | | 43/3 |
| 6,907,688 B2 * | 6/2005 | Brint | | 43/2 |
| 6,957,509 B2 * | 10/2005 | Wright | | 43/3 |
| 7,043,865 B1 * | 5/2006 | Crowe | | 43/3 |
| 7,137,221 B2 * | 11/2006 | Highby et al. | | 43/2 |
| 7,272,905 B1 * | 9/2007 | Horton | | 43/2 |
| 7,322,144 B2 * | 1/2008 | Brewer | | 43/3 |
| 7,434,347 B1 * | 10/2008 | Powell | | 43/3 |
| 7,536,823 B2 * | 5/2009 | Brint | | 43/2 |
| 7,788,840 B2 * | 9/2010 | Wyant et al. | | 43/3 |
| 8,151,512 B2 * | 4/2012 | Latschaw | | 43/3 |
| 8,256,155 B1 * | 9/2012 | Goodwill et al. | | 43/3 |
| 8,316,575 B2 * | 11/2012 | Bradley | | 43/2 |
| 2002/0162268 A1 * | 11/2002 | Fulcher | | 43/3 |
| 2006/0143968 A1 * | 7/2006 | Brint et al. | | 43/2 |
| 2007/0039227 A1 * | 2/2007 | Highby et al. | | 43/2 |
| 2008/0010892 A1 * | 1/2008 | Goebel | | 43/2 |
| 2009/0229164 A1 * | 9/2009 | Bradley | | 43/2 |
| 2009/0235571 A1 * | 9/2009 | Wyant et al. | | 43/2 |
| 2013/0014422 A1 * | 1/2013 | Bullerdick et al. | | 43/3 |

* cited by examiner

*Primary Examiner* — Darren W Ark
(74) *Attorney, Agent, or Firm* — Skinner and Associates

(57) ABSTRACT

A decoy system for use in hunting. The system includes a central base with a motor which moves a rotating member of the base. Several arms of a predetermined length are connected to the rotating member of the base, and satellite decoy elements are connected to outer ends of the arms. A central decoy element is optionally connected to the center of the rotating member. The decoy members may be birds, for example doves.

17 Claims, 12 Drawing Sheets

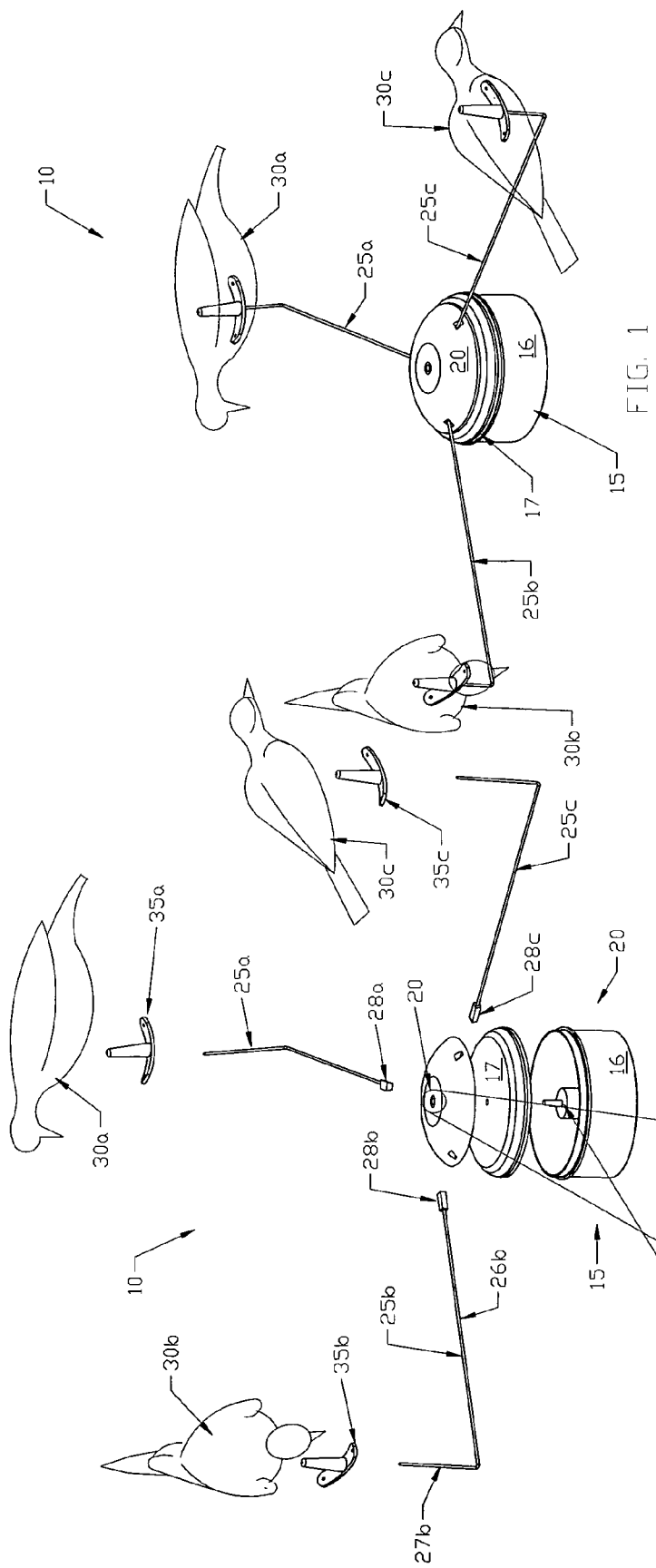

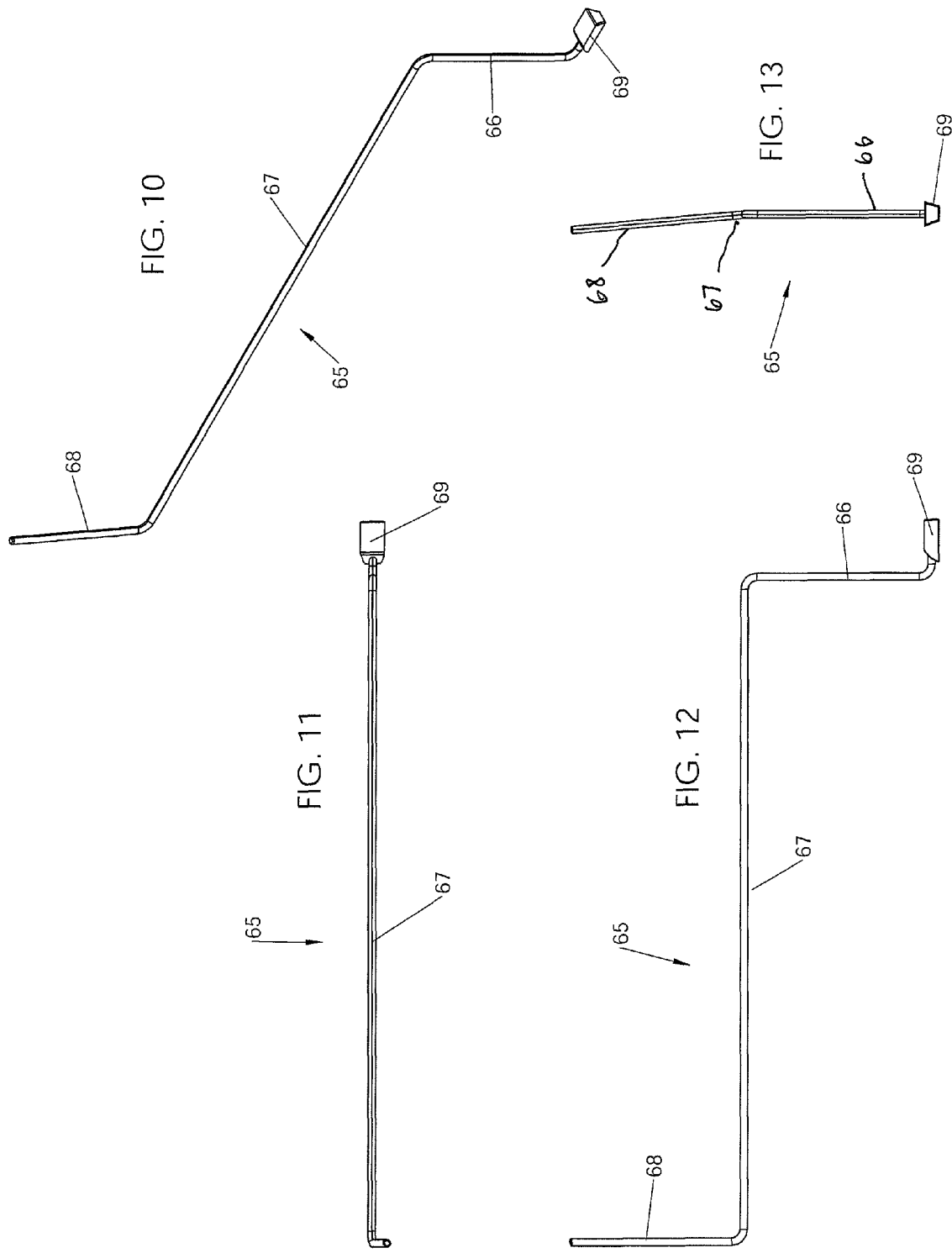

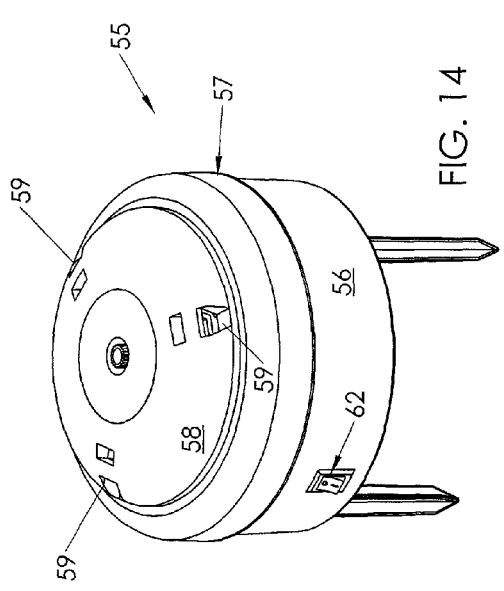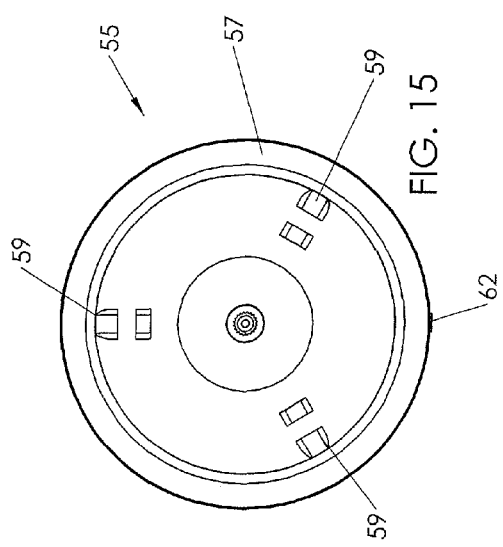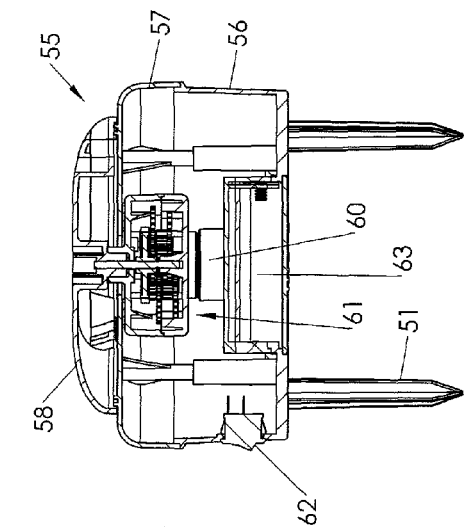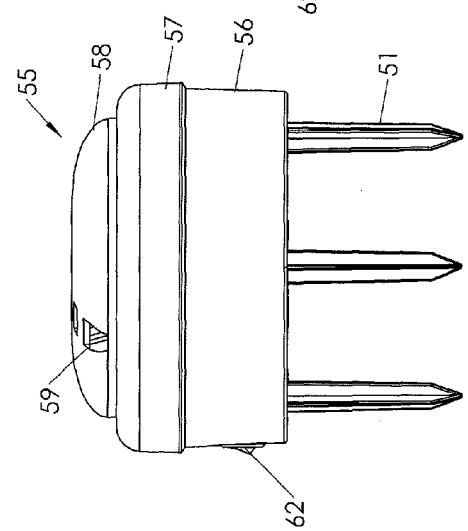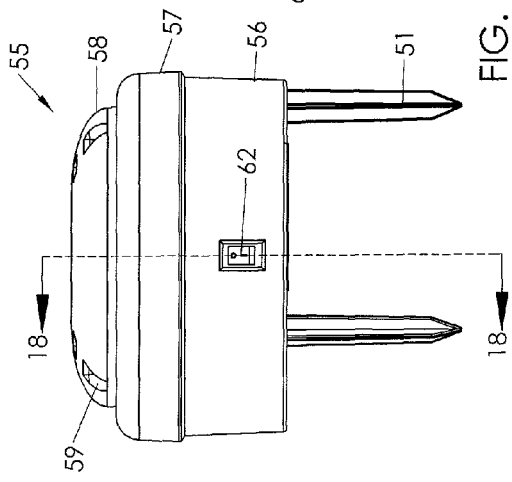

DECOY MOTION TECHNOLOGY

CROSS-REFERENCE TO RELATED APPLICATIONS, IF ANY

This application claims the benefit under 35 U.S.C. §119 (e) of U.S. Provisional Patent Application Ser. No. 61/124,490, filed Apr. 17, 2008, which is hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to decoy systems, apparatus and methods. Particularly, the invention relates to a game bird or fowl decoy motion system, apparatus and method of making and use therefor, which is especially useful in hunting.

2. Background Information

Existing decoy, including motion decoy, technology is believed to have significant limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a decoy system, apparatus and method which are practical, effective, reliable, and efficient, and which are believed to fulfill the need and to constitute improvements over the background technology.

In one aspect, the invention provides a decoy system including a central base with a motor which moves a rotating member of the base. Several arms of a predetermined length are connected to the rotating member of the base, and satellite decoy elements are connected to outer ends of the arms. A central decoy element is optionally connected to the center of the rotating member. The decoy members may be birds, for example game birds or water fowl. Examples of game birds include doves, crows or pigeons. Examples of water fowl include ducks or geese.

In another aspect, the invention provides a decoy apparatus comprising a powered base, a plurality of arms extending from the base which are rotated around the base and terminating in a distal end, and a decoy disposed at the distal end of each arm, whereby the decoys are rotated about the base.

In a more particular aspect, the invention provides a portable, quick assembly bird motion decoy apparatus comprising:
  a. a powered base including a battery power supply connected to a motor, and the motor rotating a rotating member on the base, the arms being connected to the rotating member,
  b. a plurality of arms extending from and equally spaced about the base which are rotated around the base and terminating in a distal end, and
  c. a bird decoy disposed at the distal end of each arm, whereby the decoys are rotated about the base.

And in yet another aspect, the invention provides a decoy method comprising the steps of providing a center point and a plurality of decoys disposed about the center point, and moving the decoys about the center point in a predetermined cycle.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 1 is a perspective view of an embodiment of the decoy system of the present invention.

FIG. 2 is an exploded view of the decoy system embodiment shown in FIG. 1.

FIG. 3 is a detailed view of an embodiment of a connection feature of the system, taken at Detail Connector 3 of FIG. 2.

FIGS. 10-13 are views of an embodiment of a spring arm used with the decoy system shown in FIGS. 4-9.

FIG. 14 is an isometric view of an embodiment of a base used with the decoy system shown in FIGS. 4-13.

FIG. 15 is a top, plan view of the base.

FIG. 16 is a front elevation view of the base.

FIG. 17 is a side elevation view of the base.

FIG. 18 is a crossectional view of the base taken along line 18-18 of FIG. 17.

DETAILED DESCRIPTION

Figure 4:
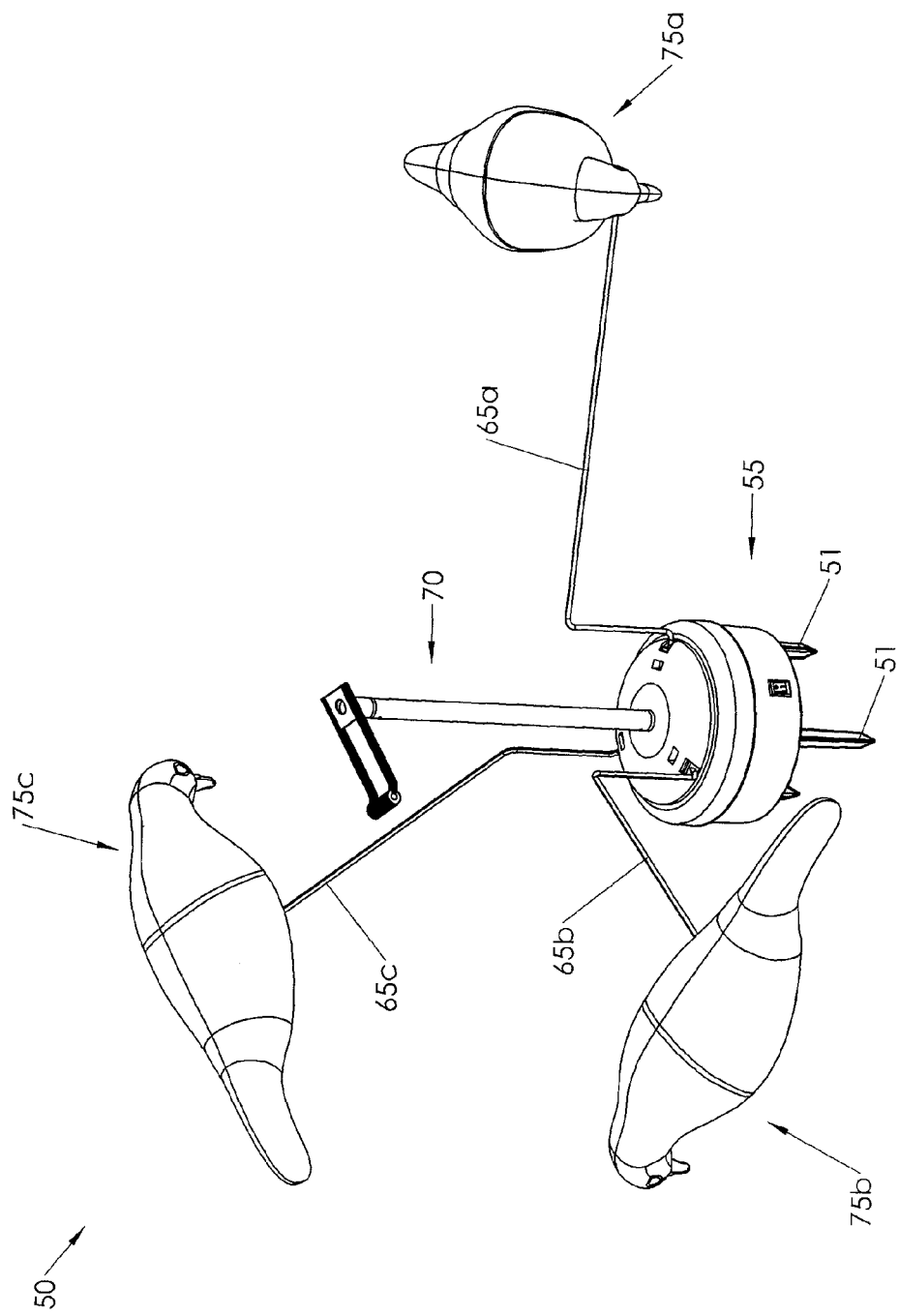
FIG. 4 is an isometric view of an alternative embodiment of the decoy system of the present invention.
Figure 5:
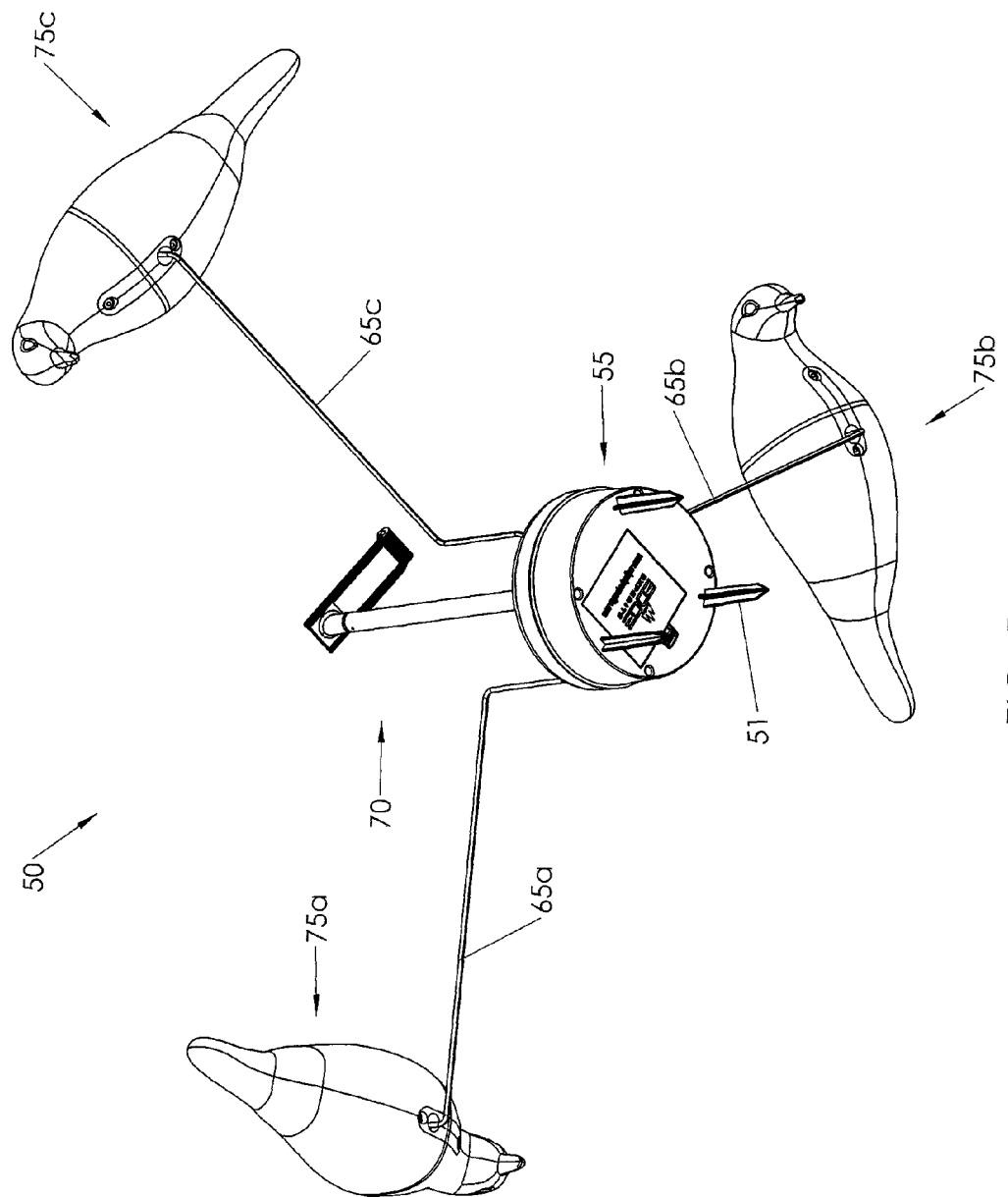
FIG. 5 is a further isometric view of the decoy system embodiment shown in FIG. 4.
Figure 6:
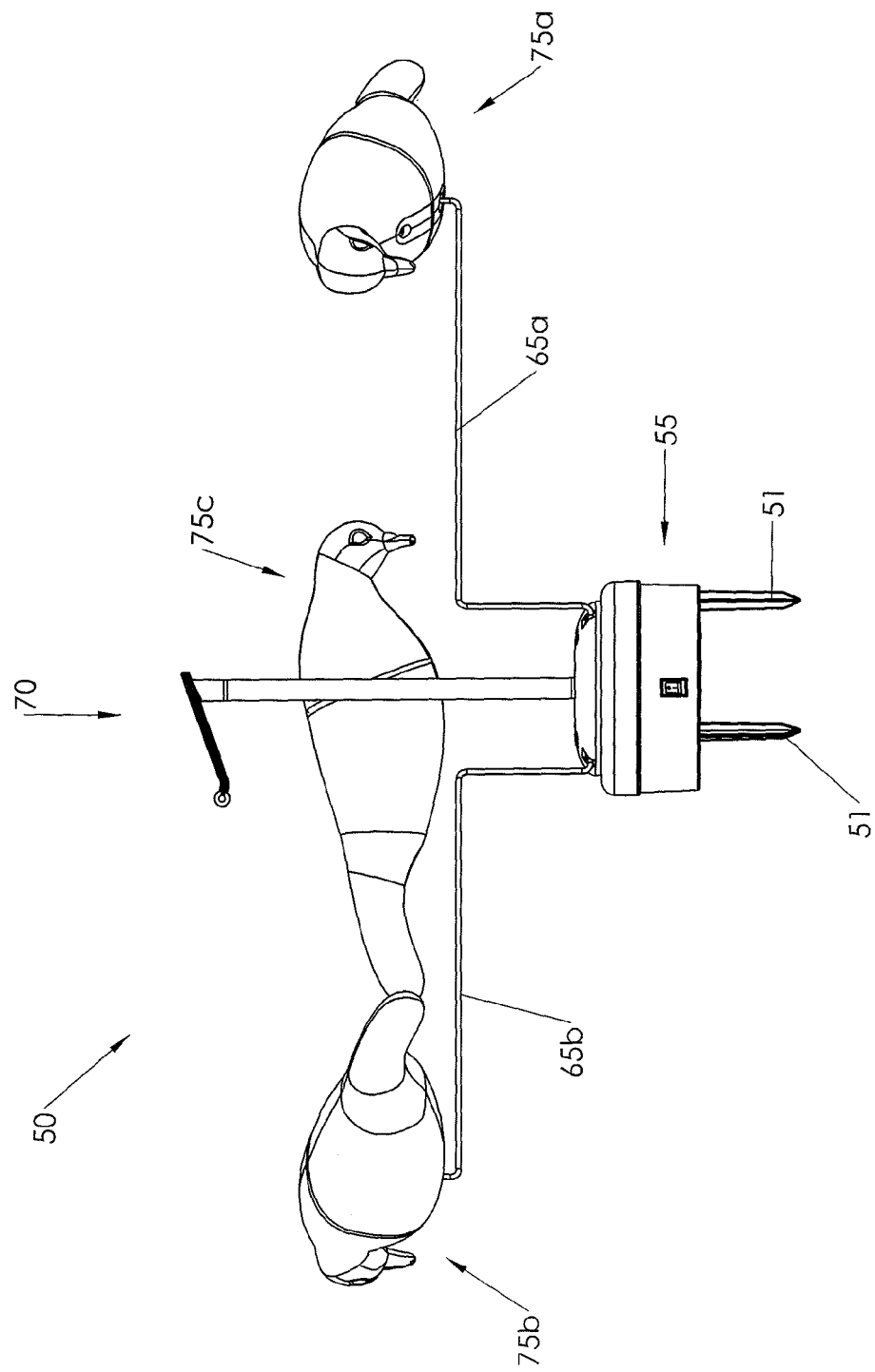
FIG. 6 is an elevation view of the decoy system shown in FIGS. 4 and 5.
Figure 7:
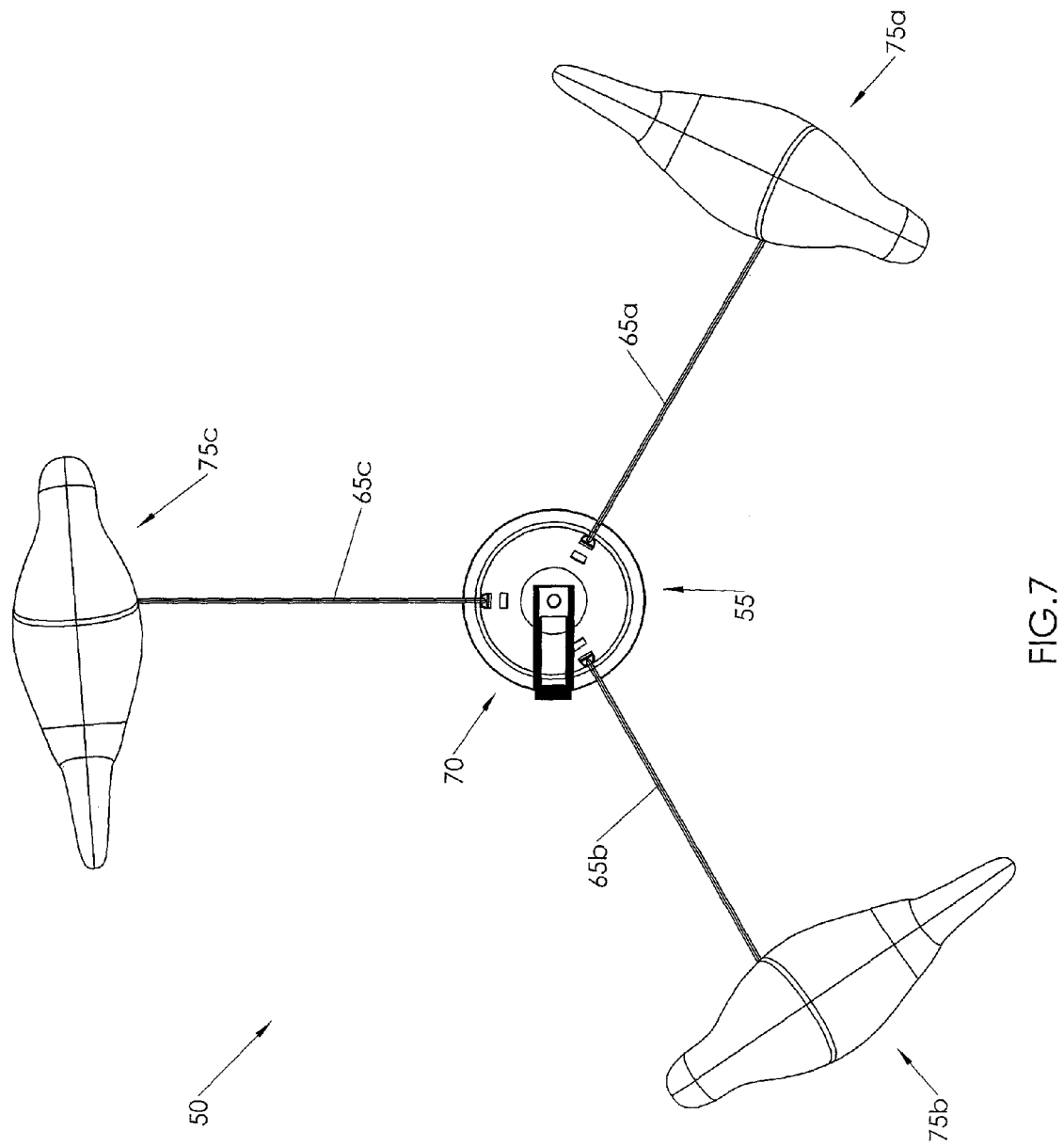
FIG. 7 is a top, plan view of the decoy system.
Figure 8:
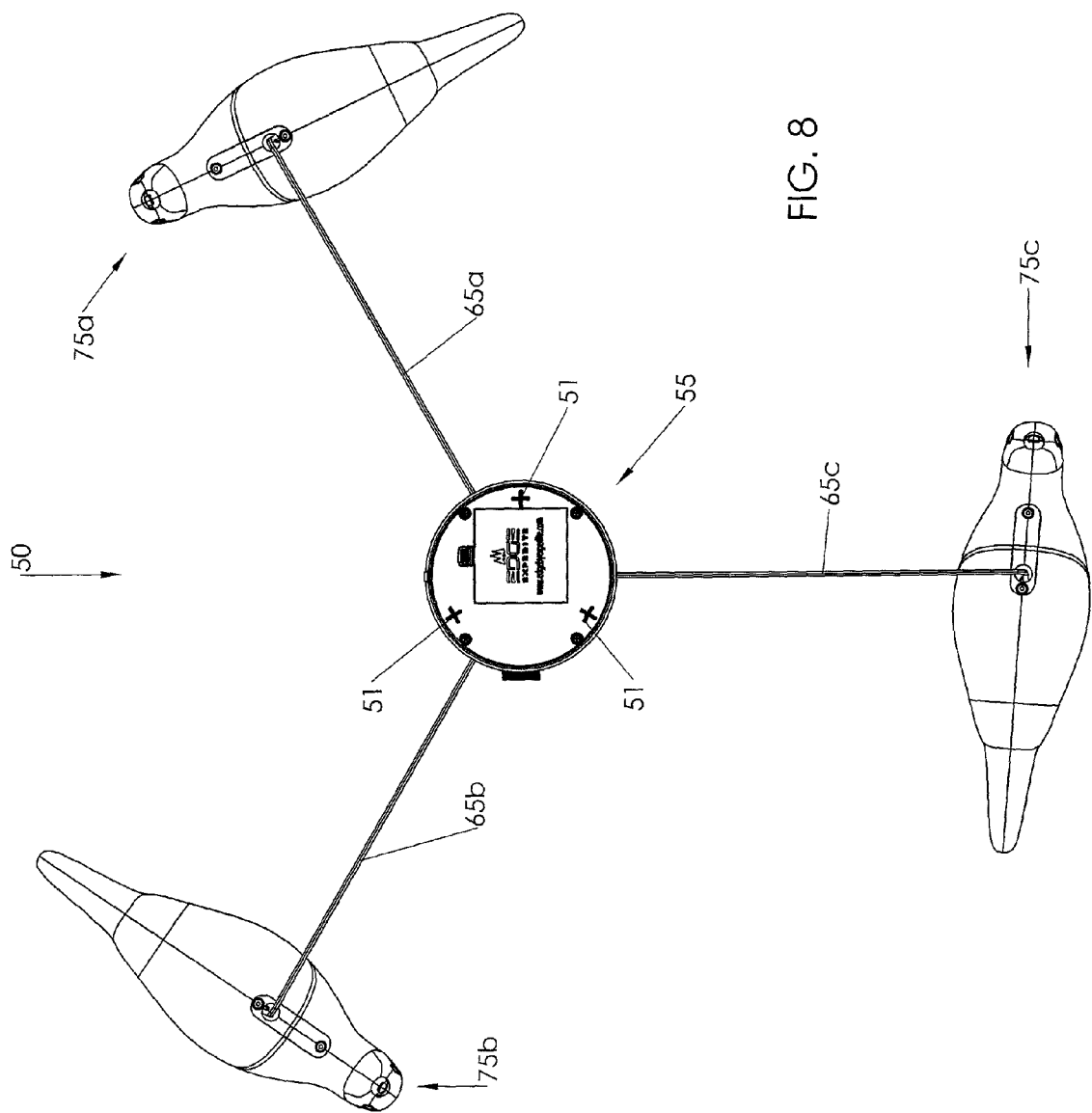
FIG. 8 is a bottom view of the decoy system.
Figure 9:
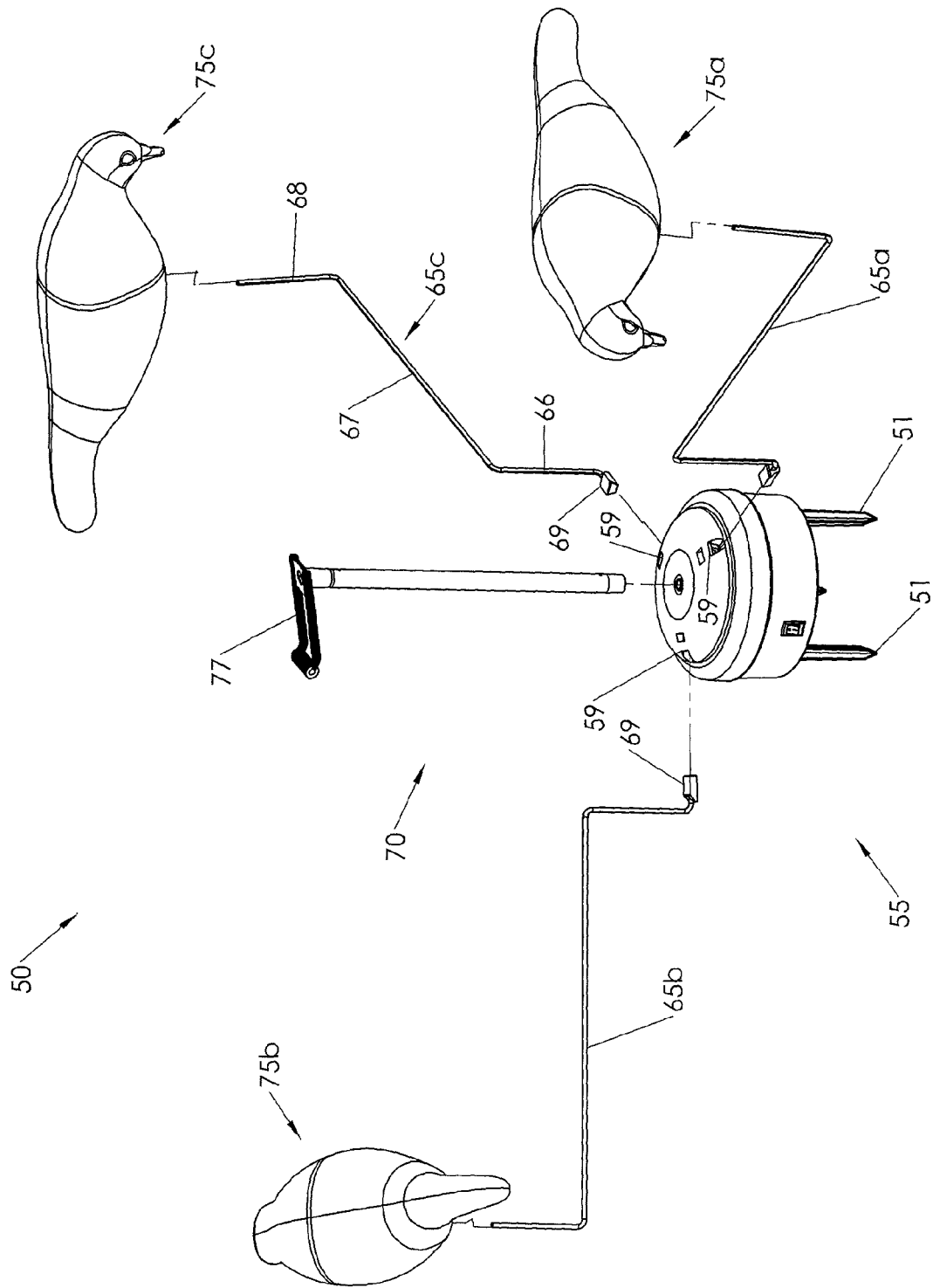
FIG. 9 is an exploded view of the decoy system.
Figure 19:
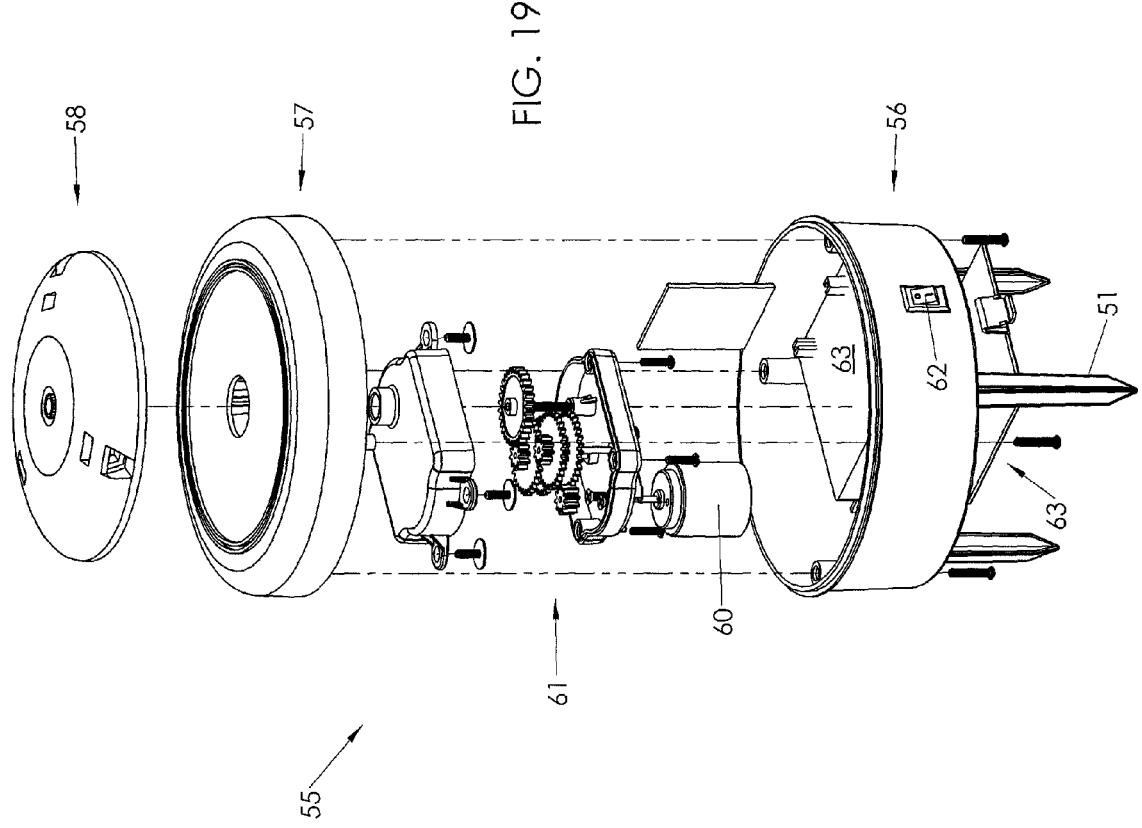
FIG. 19 is an exploded view of the base.

Game bird hunting is becoming more sophisticated as it grows in popularity. The game bird decoy system of the present invention provides added decoy realism for hunters.

The decoy system 10 of the present invention is designed to mimic birds feeding on the ground. Referring to FIGS. 1 and 2, one embodiment of the system 10 includes a central base or hub 15 with a motor 42 and associated gear box which moves a rotating member 20 of the base 15. Several arms 25a-c of a predetermined length are connected to the rotating member 20 of the base 15, and satellite decoy elements 30a-c are connected to outer ends of the arms 25a-c by sitting thereon.

The satellite decoy elements 30a-c are preferably connected to the arms 25a-c via mounts or adapters 35a-c which sit upon the outer ends of the arms 25a-c. Mounts 35a-c are disposed in the chest area of the decoys 30a-c which is at point forward of a center of the decoys 30a-c. A central decoy element (not shown) may be optionally connected to the center of the rotating member 20. The decoy members 30a-c may be birds, for example doves. The hub 15, arms 25a-c and decoy members 30a-c are all designed to be removable with respect to each other so that the system 10 may be collapsed or taken apart for storage and transport and easily set up in the field in a short period of time and in non-ideal conditions such as poor weather, extreme temperatures and low light. All or most connections are preferably snap type so that tools are not required for set up.

The system 10 rotates a plurality, preferably three (3), of satellite decoys 30a-c around the central base or hub 15. The satellite decoys 30a-c are preferably bird decoys, such as doves, and the hub 15 preferably simulates a natural element such as a rock or large stone. The arms 25a-c of are a design, construction and dimension such that the rotating (at a predetermined speed) birds 30a-c twist and turn similar to live birds feeding on the ground.

The system features a "rock like" looking motor base 15 that rotates the satellite decoys around the center hub. The base 15 may be staked to the ground. The base 15 preferably has a bottom member 16, a cover member 17 and the top rotating member 20. A built in start stop switch is preferably used to create the moving action. The system 10 breaks down for easy storage and set up in the field. For increased realism and motion, hunters can add the additional central decoy element 35, such as a Dove-n-Air™ or Air Dove™ decoy, distributed by Edge By Expedite of Hudson, Wis., US to the center of the rock like motor 15.

The decoys 30a-c are preferably blow molded. No wing bushings are required. Although 3 satellites 30a-c are preferred, the number may be varied in certain circumstances. Decoys 30a-c preferably have chest mounts 35. Alternatively, they may be connected directly to the arms 25a-c.

The arms 25 are preferably removable spring steel wire rods. The rods preferably have a horizontal member 26 of a predetermined length and a vertical member 27 formed of a 90 degree up bend. The wire 25 is preferably rounded at distal the end. Connectors 28 are disposed at the proximal end of each arm 25.

Figure 21:
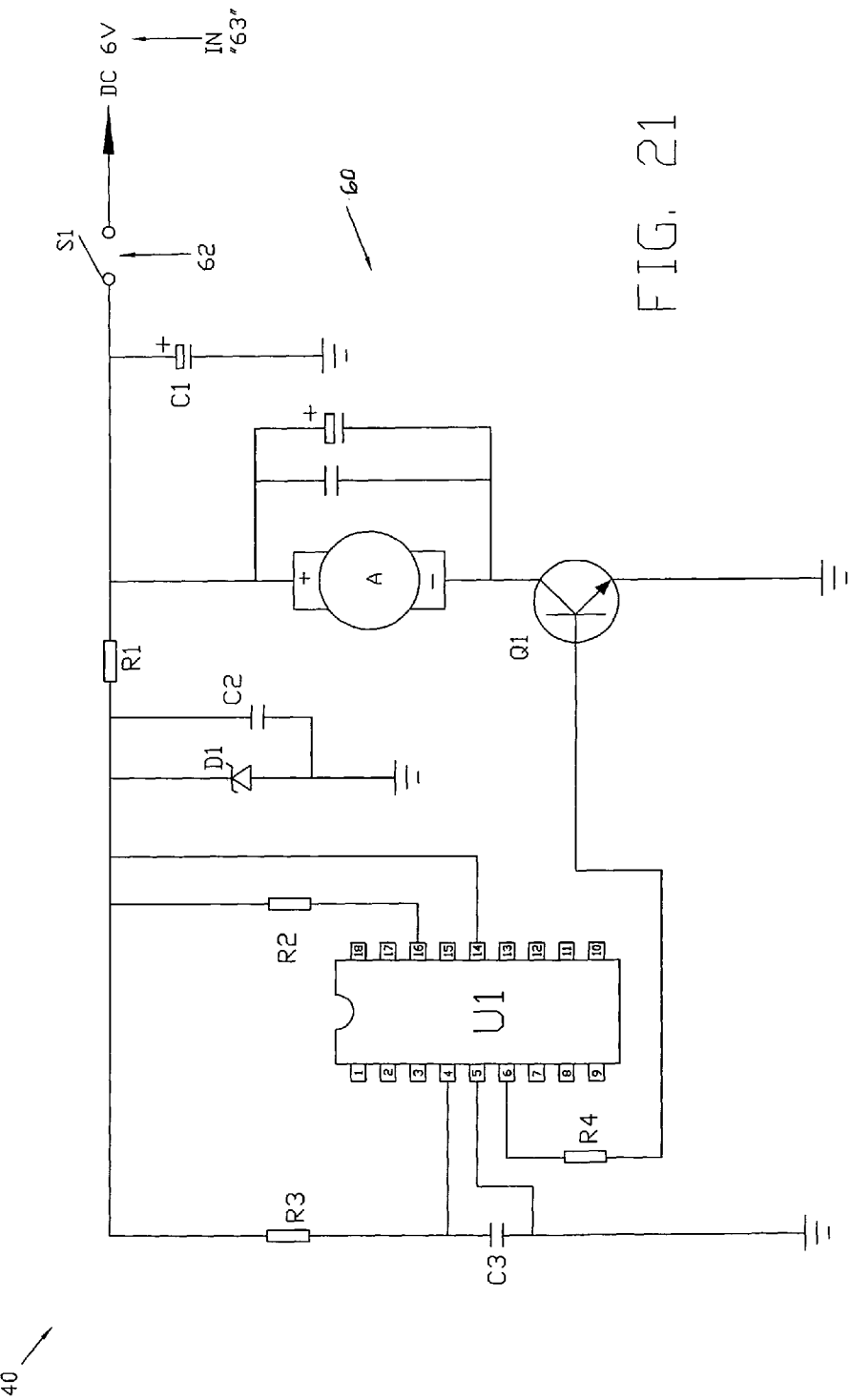
FIG. 21 is a schematic diagram of an embodiment of the electrical system for use with the decoy system.

The decoys preferably move in a circular or carousel pattern. Referring to FIG. 21, an embodiment of a timing circuit 40 is shown which controls on and off time. The circuit 40 communicatively connects a power supply 63 to the motor 60. The power supply 63 is preferably battery based, for example 4 AA batteries supplying approximately 3V power. In an embodiment of the method of use of the system 10, "On" is preferably 1 second and off is preferably 3 seconds and the cycle is preferably repeated. When moving forward, all decoys should be pointing in the direction of movement. When in stop mode, decoys should rotate back and forth. A slight 5 degree bend backward in the vertical portion of the arm forces the decoy to always point in the correct direction.

FIGS. 4-9 show an alternative embodiment of the decoy system 50. System 50 includes a central hub or base 55. Several arms 65a-c of a predetermined length are connected to the rotating member 20 of the base 15, and satellite decoy elements 75a-c are connected to outer ends of the arms 65a-c. The decoy members 75a-c are shown to be dove decoys. The system 50 may be coupled to the ground by stakes 51.

Figure 20:
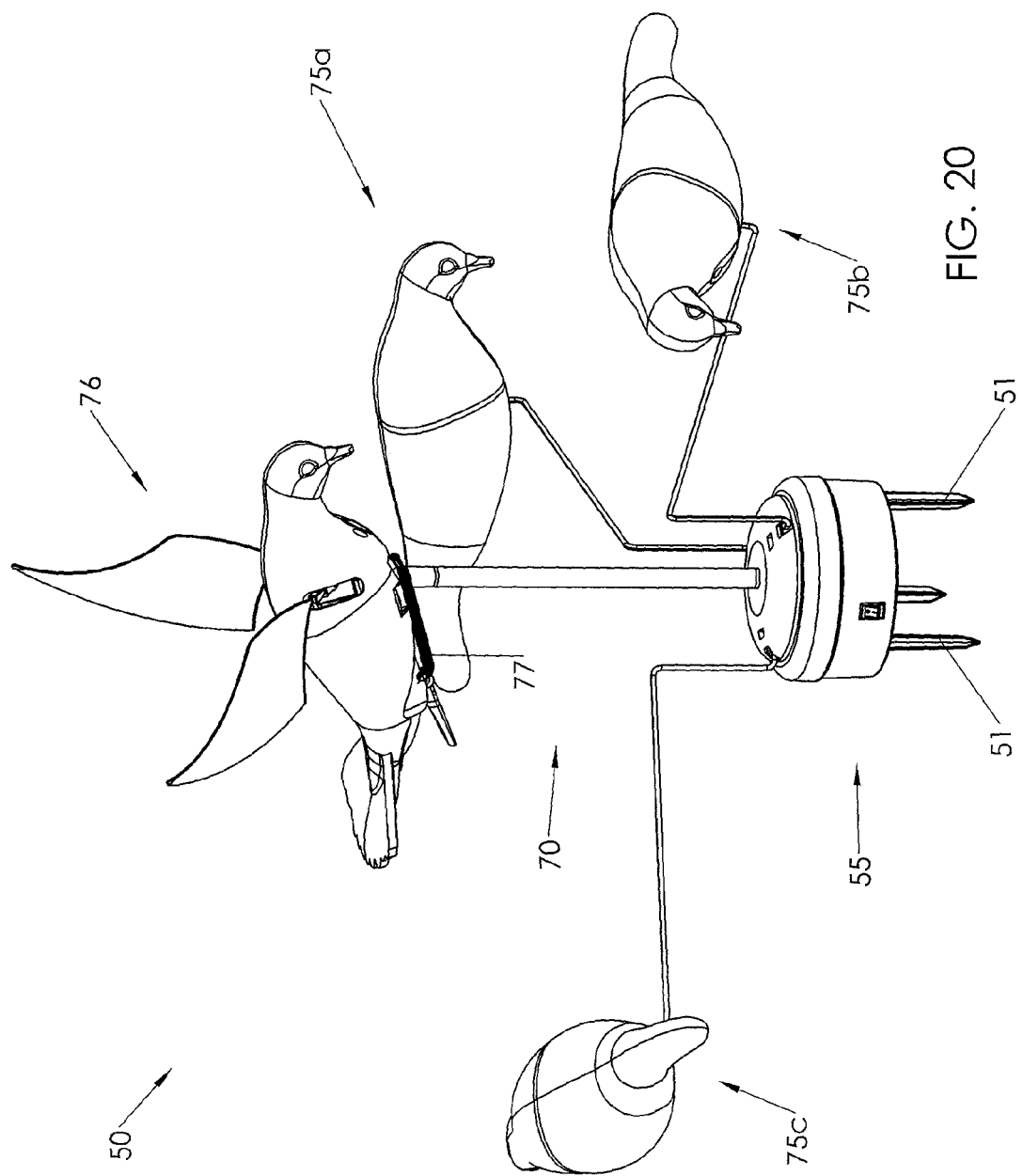
FIG. 20 is an isometric view of another alternative embodiment of the decoy system of the invention.

Referring also to FIG. 20, a central decoy element adapter rod 70 may be optionally connected to the hub 55. Central decoy 76 is connected to the top, distal end of the rod 70 via adapter 77. The central decoy is preferably a DOVE-N-AIR Dove Decoy provided by Edge By Expedite, of Hudson, Wis. USA, applicant's assignee.

Referring also to FIGS. 14-19; the hub 55 comprises a bottom member 56, a cover member 57 and a rotatable member 58. Stakes 51 extend from the bottom of the bottom member 56. A motor 60 and gearbox 61 are disposed inside the hub 55. Referring also to FIG. 21, switch 62 is disposed on the exterior of the hub 55 and is part of control circuit 40 (See FIG. 21). It controls on/off power from batteries (not shown) disposed in battery case 63 to motor 61.

Referring also to FIGS. 10-13, the arms 65a-c are preferably removable spring steel wire rods. The arms preferably have a proximal vertical member 66, a middle horizontal member 67, and a distal vertical member 68, all of a predetermined length. The proximal vertical member 66 and middle horizontal member 67 reside in a first plane and the distal vertical member 68 resides in a second plane which is at an obtuse angle to the first plane (see FIG. 13). The decoys 75a-c sit on distal ends of the distal vertical members 68 at a point forward of a center of each decoy 75a-c to facilitate natural appearing, forward facing orientation of the decoys. A snap connector 69 is disposed at the distal end of proximal member 66. Snap connectors 69 mate with snap receivers 59 disposed on rotatable member 68.

The descriptions above and the accompanying materials should be interpreted in the illustrative and not the limited sense. While the invention has been disclosed in connection with the preferred embodiment or embodiments thereof, it should be understood that there may be other embodiments which fall within the scope of the invention.

The invention claimed is:

1. A decoy apparatus comprising a powered base configured to be placed on the ground and including an electronic timing circuit which causes power to be applied in a predetermined motion cycle, a plurality of arms extending from the base which are rotated around the base and terminating in a distal end, wherein each arm of the plurality of arms has a proximal vertical member with a proximal end connected to the base and terminating in a distal end, a horizontal middle member with an inward end connected to the distal end of the proximal vertical member and an outward end, and a distal, upwardly extending vertical member with a proximal end connected to the outward end of the horizontal member and a distal end, the arm having a unitary structure, the proximal vertical member and horizontal middle member residing in a first plane, and a bird decoy disposed to sit on the distal end of each distal vertical member such that the distal end of each distal vertical member is positioned within the respective decoy, wherein each decoy sits on and is connected to the respective arm at a point forward of a center of each decoy to facilitate natural appearing, forward facing orientation of the decoys, whereby the decoys are rotated about the base, whereby the bird decoys twist and turn in the air mimicking birds feeding on the ground, and wherein the distal vertical member is angled backwards relative to a direction of movement of the decoys to facilitate natural appearing, forward facing orientation of the decoys, and the distal vertical member residing in a second plane which is at an obtuse angle to the first plane.

2. The decoy apparatus of claim 1, wherein the decoys are dove decoys.

3. The decoy apparatus of claim 1, wherein there are three decoys.

4. The decoy apparatus of claim 1, wherein the decoys are equally spaced about the base.

5. The decoy apparatus of claim 1 wherein base has a power supply connected to a motor, and the motor rotates a rotating member on the base, the arms being connected to the rotating member.

6. The decoy apparatus of claim 5, further comprising a gearbox connected between the motor and the rotating member.

7. The decoy apparatus of claim 5, wherein the base further has a bottom member for holding the power supply and the motor, and a cover member disposed on the bottom member, the rotating member being disposed on the cover member.

8. The decoy apparatus of claim 5, wherein the power supply includes at least one battery.

9. The decoy apparatus of claim 1, wherein the arms have a predetermined length from the base to the distal end of the distal vertical member.

10. The decoy apparatus of claim 9, wherein each arm has a snap connected disposed at the proximal end of the proximal vertical member for connection to the base.

11. The decoy apparatus of claim 1, wherein each decoy is connected to its associated arm via a mount adapter.

12. The decoy apparatus of claim 1, further comprising at least one stake connected to the base for securing the base to the ground.

13. The decoy apparatus of claim 1, further comprising at least one central decoy member connected to the base, the decoys connected to the arms rotating about the at least one central decoy member.

14. The decoy apparatus of claim 13, wherein the at least one central decoy member is connected to a vertical arm extending upwardly from the base.

15. The decoy apparatus of claim 1, wherein the base, arms and decoys are hand attachable and detachable to each other.

16. A portable, quick assembly land based bird motion decoy apparatus comprising:
   a. a powered base configured to be placed on the ground, the base including a battery power supply connected to a motor, and the motor rotating a rotating member on the base, the arms being connected to the rotating member, the motor being communicatively connected to an electronic timing circuit which causes the rotating member to undergo a predetermined motion cycle wherein the motor is activated for a predetermined activation period of time and then deactivated for a predetermined deactivation period of time that is longer than the activation period of time, and then activation and deactivation is repeated,
   b. a plurality of elongated, flexible arms extending from and equally spaced about the base which are rotated around the base, wherein each arm has a proximal vertical member with a proximal end connected to the base and a distal end, a horizontal middle member with a proximal end connected to the distal end of the proximal vertical member and an outward end, and a distal, upwardly extending vertical member with a proximal end connected to the outward end of the horizontal middle member and a distal end, each arm being constructed of a single piece of wire material, the proximal vertical member and horizontal middle member residing in a first plane, and the distal vertical member residing in a second plane which is at an obtuse angle to the first plane,
   c. each arm having a snap connector disposed at the proximal end of the proximal vertical member, for connection to the base;
   d. a mount adapter connected to each distal vertical member, the distal end of each distal vertical member being positioned within the respective mount adapter; and
   e. a bird decoy disposed at the distal end of each distal vertical member of each arm, each decoy being connected to its associated arm via the mount adapter which is positioned within the respective decoy, whereby each of the decoys sit upon the respective distal end of the distal vertical member of each arm at a point forward of a center of each decoy to facilitate natural appearing, forward facing orientation of the decoys which are rotated about the base, whereby the bird decoys twist and turn in the air mimicking birds feeding on the ground during the motion cycle by way of the starting and stopping motor and the flexible arms, and whereby the distal vertical member is angled backwards relative to a direction of movement of the decoys to facilitate natural appearing, forward facing orientation of the decoys.

17. The decoy apparatus of claim 16, where the activation period of time is approximately 1 second and the deactivation period of time that is approximately 3 seconds.

* * * * *